US009009218B2

(12) United States Patent
Chen et al.

(10) Patent No.: US 9,009,218 B2
(45) Date of Patent: Apr. 14, 2015

(54) CLOUD SERVER/THIN CLIENT/GATEWAY SELECTIVE BROWSER INSTANTIATION

(75) Inventors: Sherman (Xuemin) Chen, Rancho Sante Fe, CA (US); David Erickson, San Clemente, CA (US); Vladimir Silyaev, Laguna Niguel, CA (US); Alan Trerise, Los Gatos, CA (US); Marcus C. Kellerman, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 445 days.

(21) Appl. No.: 13/114,967

(22) Filed: May 24, 2011

(65) Prior Publication Data

US 2012/0215834 A1 Aug. 23, 2012

Related U.S. Application Data

(60) Provisional application No. 61/445,683, filed on Feb. 23, 2011.

(51) Int. Cl.
*G06F 15/16* (2006.01)
*G06F 17/30* (2006.01)
*H04L 29/08* (2006.01)
*H04L 29/06* (2006.01)

(52) U.S. Cl.
CPC .... *G06F 17/30905* (2013.01); *H04L 29/08846* (2013.01); *H04L 67/04* (2013.01); *H04L 63/0281* (2013.01)

(58) Field of Classification Search
CPC .......... H04L 29/00; H04L 29/08; H04L 29/06
USPC .................................. 709/202, 203, 219, 231
See application file for complete search history.

(56) References Cited

U.S. PATENT DOCUMENTS

| | | | | | |
|---|---|---|---|---|---|
| 6,134,591 | A | * | 10/2000 | Nickles | 709/229 |
| 6,806,887 | B2 | * | 10/2004 | Chernock et al. | 345/629 |
| 8,032,577 | B2 | * | 10/2011 | Danner et al. | 709/200 |
| 2002/0015042 | A1 | * | 2/2002 | Robotham et al. | 345/581 |

* cited by examiner

*Primary Examiner* — Andrew Lai
*Assistant Examiner* — Sumitra Ganguly
(74) *Attorney, Agent, or Firm* — Garlick & Markison; Jessica W. Smith

(57) ABSTRACT

A gateway having at least one communications interface and processing circuitry establishes communications with at least one service provider device and at least one serviced client device. The gateway then determines that a serviced client device is to establish an Internet browsing session. Based upon characteristics of the serviced client device, the gateway determines where to instantiate a web browser to service the Internet browsing session. Based upon the determination, in a first operation, instantiates the web browser to service the Internet browsing session at the gateway or client device. In a second operation, the gateway instantiates the web browser to service the Internet browsing session at a service provider server. In other operations, the gateway may determine to instantiate a browser for a first client device at a cloud server and to instantiate a browser for a second client device either locally or at the second client device.

28 Claims, 9 Drawing Sheets

CLOUD SERVER/THIN CLIENT/GATEWAY SELECTIVE BROWSER INSTANTIATION

CROSS-REFERENCE TO PRIORITY APPLICATION

This application claims priority under 35 U.S.C. §119(e) to U.S. Provisional Application Ser. No. 61/445,683 filed Feb. 23, 2011, which is incorporated herein by reference in its entirety.

BACKGROUND OF THE INVENTION

1. Field of the Invention

The present invention relates generally to electronic devices; and more particularly to streamed content delivery and Internet Access of such electronic devices.

2. Description of the Related Art

Multimedia systems in the home and within other premises are often times serviced by cable Set Top Boxes (STBs), satellite system STBs, and Digital Subscriber Line (DSL) STBs. These STBs now often service Internet Browsing activities of serviced devices. These serviced devices may be televisions, DVD players, portable media players, video games, and other types of client devices. Serviced devices may also include high functionality devices such as desktop computers, laptop computers, tablet computers and other high processing capacity devices. The STBs service Internet Browsing sessions for all serviced devices, independent of their processing abilities. Some of these processing devices have just enough processing capacity to service a web browser. However, as is generally known, web browsers are susceptible to viruses, malware, and other destructive content that are injected into the device during the Internet Browsing sessions. Processing devices without sufficient processing capacity to run protection software will become easily infected by such destructive content. Once this destructive content has infected one client computer it may wreak havoc with all client devices on the client side of a servicing STB. Further, the processing requirements of some web browser processes may exceed the processing abilities of the serviced devices, causing the web browsing process to partially or fully fail.

DETAILED DESCRIPTION

Figure 1:
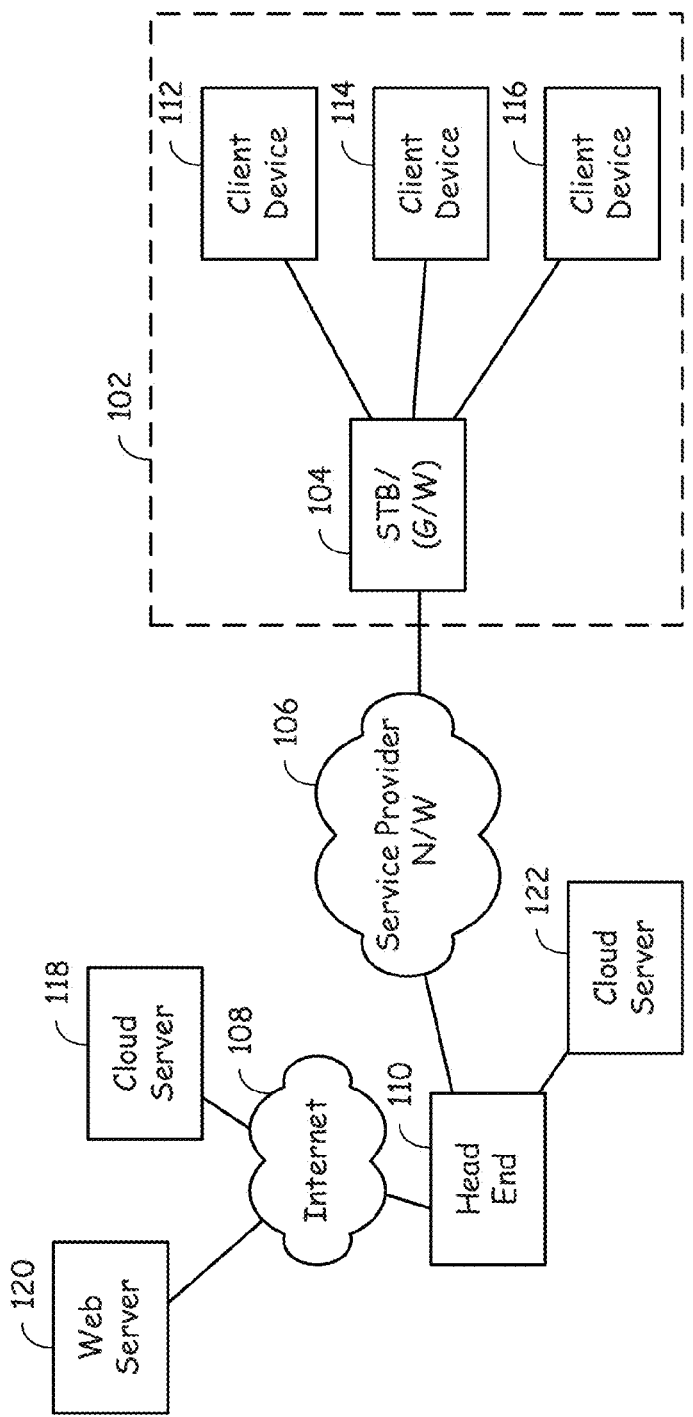
FIG. 1 is a block diagram illustrating a system constructed according to one or more embodiments of the present invention.

FIG. 1 is a block diagram illustrating a system 100 constructed according to one or more embodiments of the present invention. The system 100 is supported by an Internet Network 108 and includes a web server 120 coupled to the Internet 108, a cloud server 118 coupled to the Internet 108, a service provider head end 110 coupled to the Internet 108, a cloud server 122 coupled to the head end 110, and a service provider network 106 coupled to the head end. The service provider network 106 of FIG. 1 is one or more of a fiber network, a cable network, a telephone network, or another type network serviced by physical media.

A client site 102 includes a Set Top Box (STB) 104, referred to herein interchangeably as a Gateway (G/W), which services a plurality of client devices 112, 114, and 116 at a customer site, such as a home, office, or other customer setting. The client devices 112, 114, and 116 include one or more thin clients, the thin clients being televisions, video players, video game consoles, etc. The client devices 112, 114, and 116 may also include other devices that are not considered thin clients, such as desktop computers, laptop computers, tablet computers, etc. A thin client, as distinguished from a non-thin client, has limited processing capacity and limited memory.

Figure 2:
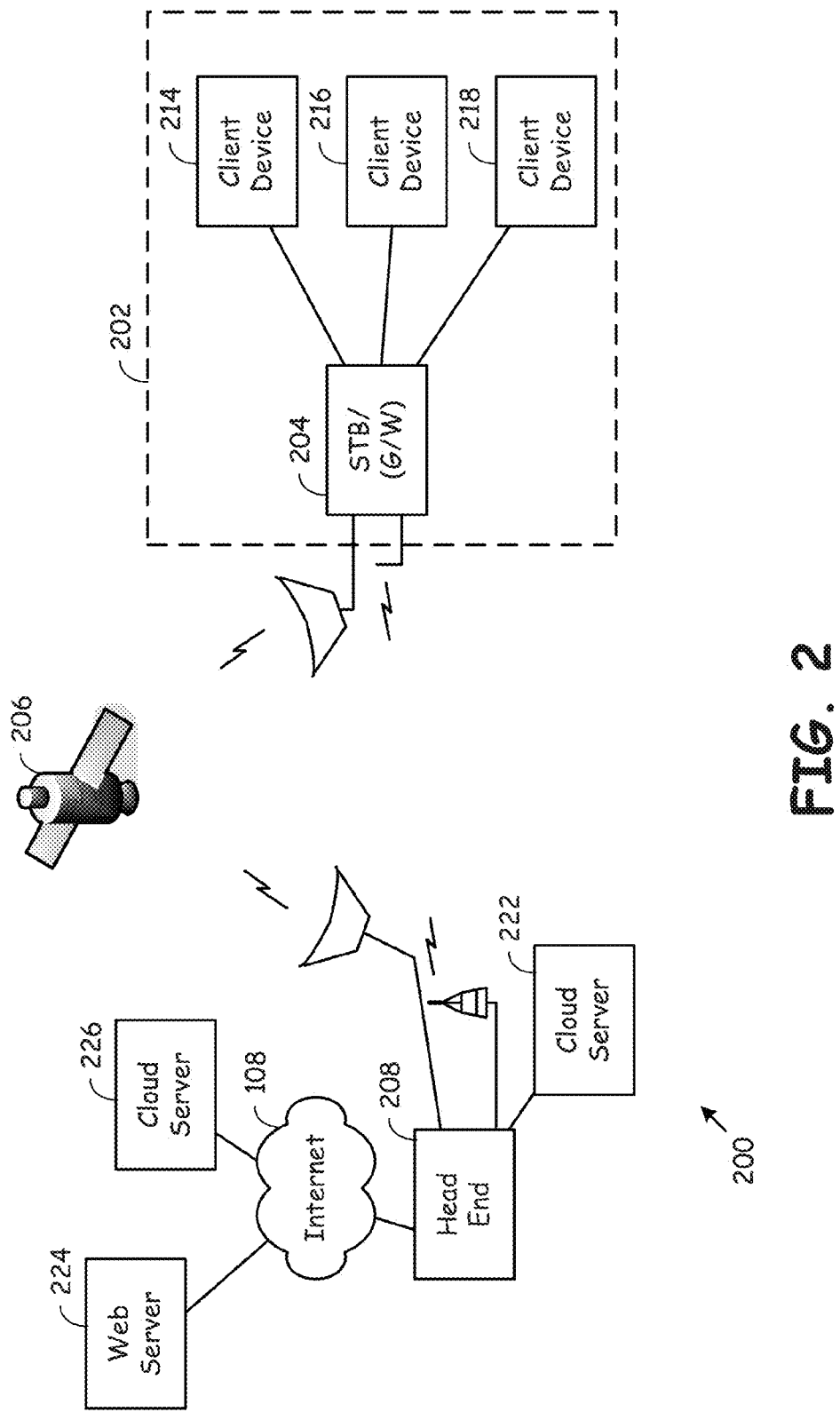
FIG. 2 is a block diagram illustrating a system constructed according to one or more other embodiments of the present invention.

FIG. 2 is a block diagram illustrating a system 200 constructed according to one or more other embodiments of the present invention. The system 200 of FIG. 2 is similar to the system 100 of FIG. 1, except that a head end 208 communicates with a STB 204/Gateway via one or more wireless links, as contrasted to the wired links of FIG. 1. With the structure 200 of the system of FIG. 2, as well as the structure of FIG. 1, the STB 204 services a plurality of client devices 214, 216, and 218. The wireless link may be serviced by satellite dishes and convey communications between the head end 208 and the STB 204 via a satellite 206. Alternately, the wireless link may be serviced by a point to point wireless link, a Wireless Local Area Network (WLAN), a Wireless Wide Area Network (WWAN), or another type of wireless link, e.g., 60 GHz, etc.

STB 204 serves at least client device 214, 216, and/or 218 (Television, Personal Media Player, game console, laptop computer, desktop computer, palm computer, etc.). Each of the STB 204 and client devices 214, 216, and/or 218 may have limited resources for web browsing, e.g., processing of content contained in web pages to render experience to users. Some client devices 214, 216, or 218 may not be able to interact with web servers at all because of their reduced processing capabilities, i.e., not able to service a web browser application.

The STB 204 may have the ability to service web browsing for one or more of the client devices 214, 216, and/or 218 but may also be resource limited, e.g., memory, communications, and/or processing limited. A primary function of the STB 204 is to provide video service to the thin clients. It cannot fail to provide this service while providing web browsing services to the client devices 214, 216, and/or 218. Thus, even though it may have the processing capabilities to service an Internet browsing session, it may not be able to service such Internet browsing session without interfering with its other processing requirements.

A cloud server 222 (or 226) couples to or is accessible to a head end 208 of the service provider. The cloud server 222 interacts with the STB 204 or thin client 214, 216, and/or 218 via the STB 204 to remotely service web browsing session(s) for one or more of the client devices 214, 216, and/or 218. The cloud server 226 interacts with the STB 204 (via the head end 208) to interface with a user of a thin client 214, 216, and/or 218 to receive user input, i.e., keypad input, cursor input, voice input, etc. The cloud server 222 or 226 supports at least a portion of a web browser session for a thin client. The cloud server 222 or 226 produces a video stream (H.264, MPEG, AVC, etc.) that is streamed to the thin client 214, 216, and/or 218 via the head end 208 and the STB 204.

By placing browser functionality in the cloud server 222 or 226, processing workload for the STB 204 and/or client devices 214, 216, and/or 218 is substantially reduced. Further, the cloud server 222 or 226 is better able to protect a thin client 214, 216, and/or 218 and STB 204 from dangers associated with web browsing, e.g., IP service attack, malware, viruses, etc. Content that is available to the thin clients 214, 216, and/or 218 may be limited by the cloud server 222 or 226.

Figure 3:
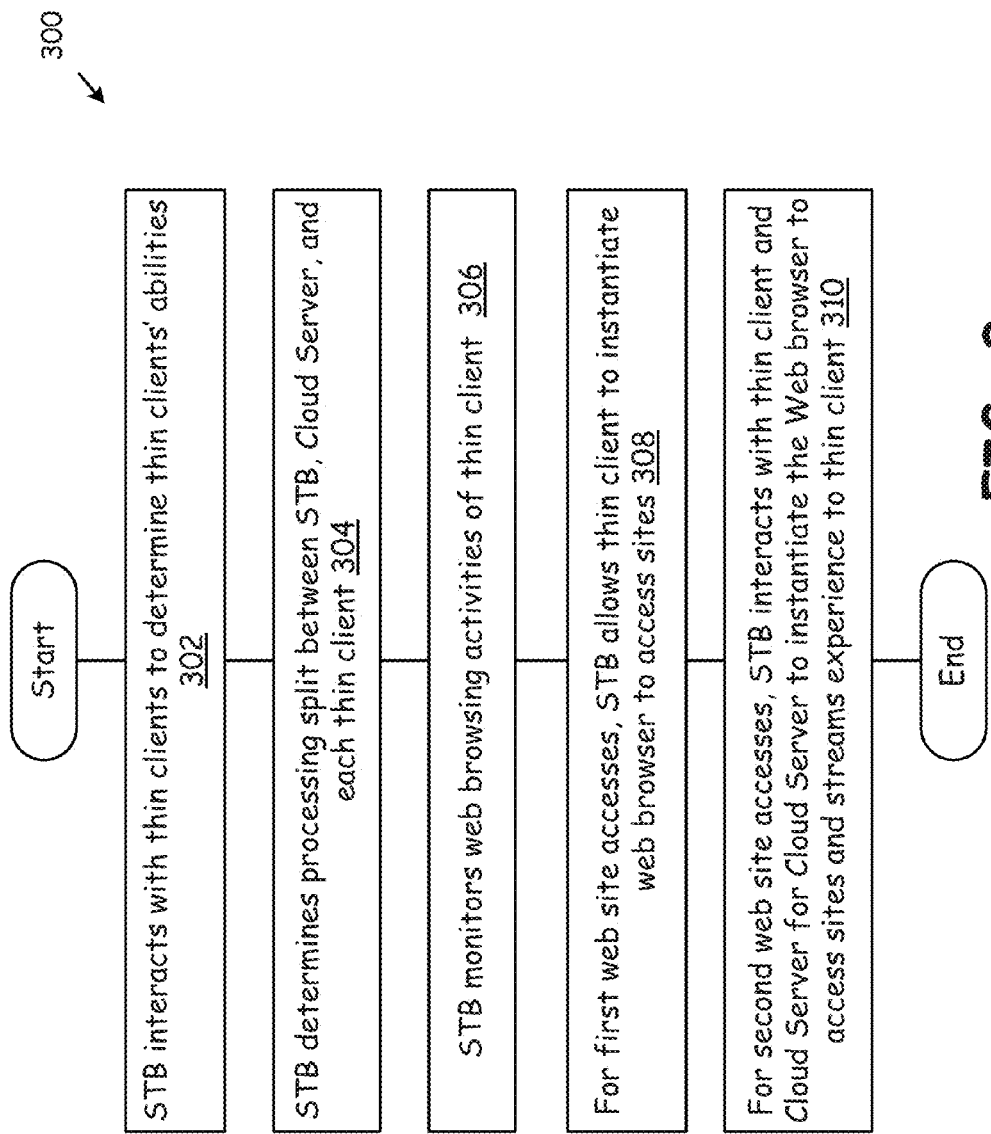
FIG. 3 is a flow chart illustrating operations according to one or more embodiments of the present invention.

FIG. 3 is a flow chart illustrating operations according to one or more embodiments of the present invention. Referring to both FIGS. 1 and 3, with the operations 300 of FIG. 3, a STB 104 interacts with client devices 112, 114, and 116 to determine their abilities (Step 302). The STB 104 then determines a processing split between the STB 104, a cloud server 122, and each client device 112, 114, and/or 116 (Step 304). The STB 104 then monitors the web browsing activities of a thin client, e.g., 114 (Step 306). For first web site accesses, the STB 104 allows the thin client 114 to instantiate a browser to access web sites that are considered safe sites (Step 308). For second web site accesses, the STB 104 interacts with the thin client 114 and the cloud server 122 for the cloud server 122 to instantiate the browser for thin client 114 access to second web sites (unsafe sites). The cloud server 122 then streams the web browsing experience to the thin client 114 (Step 310). In such case, the web browsing experience is streamed in a "safe" format, e.g., H.264 or MPEG format.

STBs and thin clients may be able to instantiate a web browser but may not have sufficient resources to protect against viruses and malware or to otherwise provide full support safely for a web browser. Depending upon a web site visited, e.g., safe site, complexity of rendering required, etc., a decision is made where to instantiate the web browser, i.e., where video is rendered for web page visit. For a safe list of sites, the STB or thin clients may instantiate the web browser. For other sites, the cloud server will instantiate the web browser and will protect/offload the STB and thin client(s) from web browser servicing. Safe list of sites may be unique for each thin client, may be accumulated for all thin clients via STB, etc.

Other considerations in determining where to instantiate the web browser include available processing resources, browser capability (is STB/thin client capable of rendering all web page content), whether the cloud server has sufficient capacity to instantiate web browser, what throughput capacity is available between to service H.264 video stream or web page content. The STB can serve as a multiplexer/demultiplexer for multiple thin clients. For example, each of three thin clients is separately serviced by the cloud server, i.e., three separate web sessions. The STB multiplexes and demultiplexes the multiple respective sessions for the three thin clients. For multiple thin clients, STB bundles web requests to cloud server.

Figure 4:
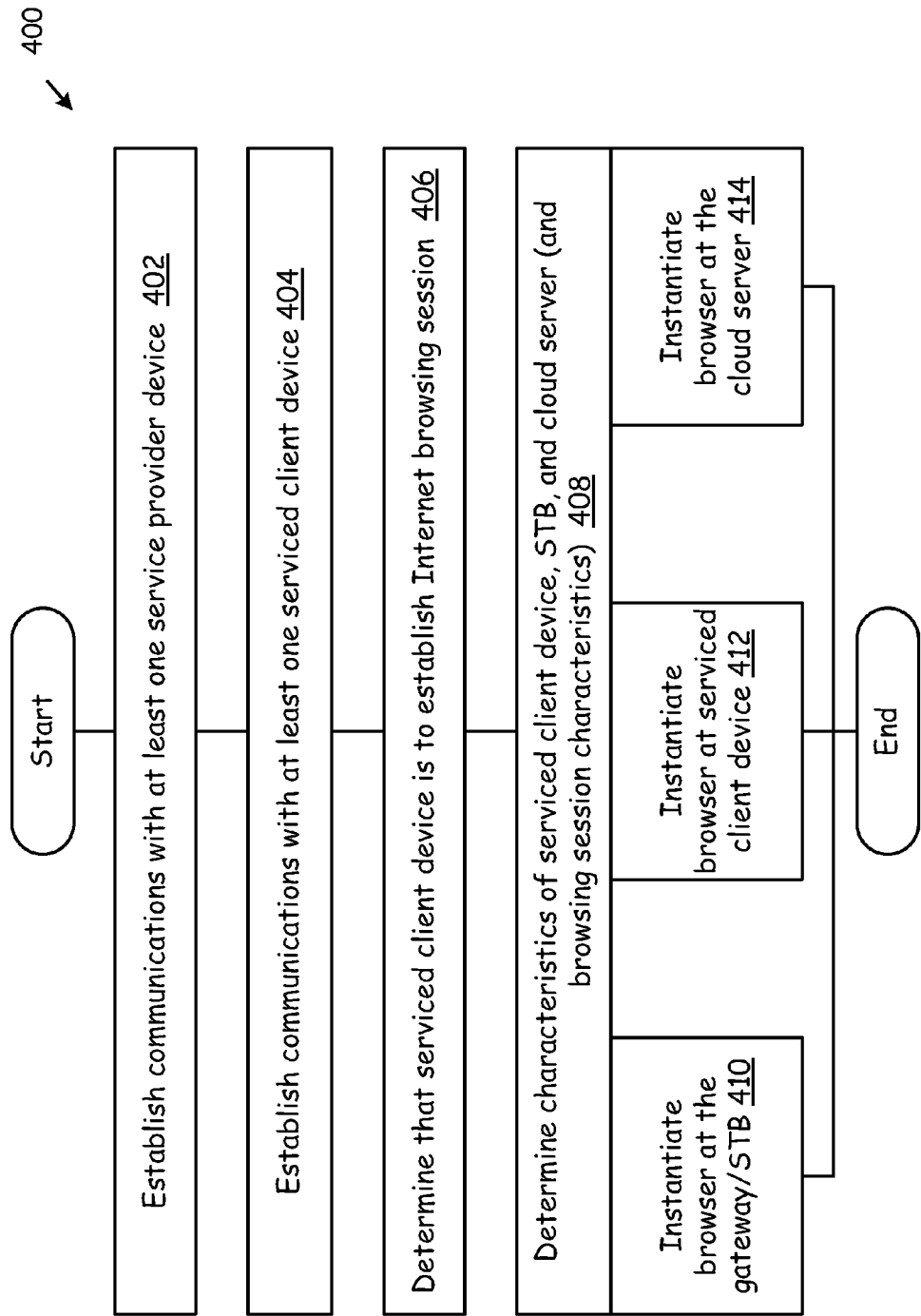
FIG. 4 is a flow chart illustrating operations according to one or more embodiments of the present invention.

FIG. 4 is a flow chart illustrating operations according to one or more embodiments of the present invention. The operations 400 of FIG. 4 are performed by one or more of a cloud server, a STB, and/or a client device. Generally, the operations 400 of FIG. 4 are directed toward dividing browser instantiation operations amongst these various devices in a slightly differing manner than was previously described with reference to FIG. 3.

The operations 400 of FIG. 4 commence with a gateway 104 establishing communications with at least one service provider device (Step 402). The service provider device would typically be a head end 110 and/or a cloud server 118 or 122 of FIG. 1. Alternately, the gateway 204 of FIG. 2 would establish communications with head end 208 and/or cloud server 222 or 226 of the system 200 of FIG. 2. In establishing such communications, the STB 204 of FIG. 2 or 104 of FIG. 1 would establish secure communications that would enable the delivery of content from the service provider to the various serviced client devices 214, 216, 218 of FIG. 2 or 112, 114, 116 of FIG. 1. These operations are generally known and will not be described further herein except as they relate to the present invention.

The operations 400 of FIG. 4 continue with the STB 104 establishing communications with at least one serviced client device (Step 404), which of FIG. 1 includes client devices 112, 114, and 116. The system 200 of FIG. 2 includes client devices 214, 216, and 218. As was previously described, any of these client devices 112, 114, or 116 of FIG. 1 and client devices 214, 216, and/or 218 of FIG. 2 may be thin clients or other client devices (non-thin clients). For example, thin clients have limited processing capability, such as televisions, video disc players, gaming consoles, or other similarly process enabling devices. However, other client devices may be personal computers, laptop computers, notepad computers, or other devices that have more processing resources and capabilities. Thus, the operations 400 of FIG. 4 are dependent upon the characteristics of such client devices.

The operations 400 of FIG. 4 continue with the STB 104 determining that a serviced client device, e.g., 112, desires to establish an Internet browsing session (Step 406). With the operations of Step 406, with further reference to FIG. 1, client device 112 may desire to access web server 120 via the various communication paths serviced thereby. In such case, client device 112 may send a request via a web browser instantiated by the client device 112 or may simply send a request to STB 104 that is relayed to web server 118. In such operations, the STB 104 would determine that the client device 112 desires to establish a web Internet browsing session with the web server 120.

Operations 400 of FIG. 4 continue with the STB 104 determining characteristics of the serviced client device 112 and the browsing session characteristics (Step 408). The characteristics of the serviced client device 112 may include its processing resource capabilities, its memory capabilities, the other processing capabilities it is currently servicing, and/or other characteristics of the serviced client device that would affect the ability of the serviced client device to service an Internet browsing session by instantiating a browser thereon. Further, characteristics of the browsing session as determined at Step 408 may include the type of browsing, the site being browsed, the type of Internet data that would be required to create a browser interface for a user of the serviced client device, and/or other Internet browsing session characteristics.

Based upon the determination made at Step 408, the STB 104 makes a determination of where to instantiate a browser to service the browsing session. Such determination made at Step 408 may further consider the available processing resources at the STB 104 and the available processing resources or the availability of a cloud server 122. Based upon all such characteristics, in a first operation, the STB 104 instantiates a browser to service the Internet browsing session (Step 410). In such case, the STB 104 interacts with the web server 120 that the serviced client device 112 desires to access and the STB 104 effectively runs a browser to service the Internet browsing session of the serviced client device 112 by interfacing with the web server in an IP/web browsing characteristic. Further, the STB 104 receives browsing commands from the thin client 112 and uses these browsing commands in servicing the Internet browsing session. In such case, the STB 104 creates a streaming video representation of the Internet browsing session on behalf of the serviced client device and presents the Internet browsing session in a streamed video format to the serviced client device via its coupled communication path. The streamed video session may be serviced according to the H.264 streamed video operating standard, the MPEG operating standard, or according to another streamed video standard supported by both the STB 104 and the serviced client device 112.

According to a second determination made at Step 408 of the operations 400 of FIG. 4, the STB 104 and/or other devices participating in the decision made at Step 408 determines to instantiate the browser at the serviced client device 112 (Step 412). In such case, the devices or device making the decisions to instantiate the browser at the serviced client device 112 determines that the serviced client device 112 is able to successfully interface directly with web server 120 to service the Internet browsing session. In such case, the browser is loaded and processed by processing resources of the serviced client device 112 and provides an interface to a user of the serviced client device 112. In such case, it is determined that the serviced client device 112 has processing resources currently available and sufficient protection to service the Internet browsing session.

Based upon a third determination at Step 408 of the operations 400 of FIG. 4, it is determined to instantiate the browser at cloud server 122 on behalf of the serviced client device 112 and the servicing STB 104. In such case, the cloud server 122 interacts with web server 120 and services the browsing session for the serviced client device 112. The cloud server 122 then transmits a video stream to the client device 112 via coupling networks and the STB 104 to the serviced client device 112 that represents the web browsing session. The video stream is formatted consistently with video operations supported by both the cloud server 122 and the serviced client device 112.

According to the operations of Step 410 and 414, Internet browsing commands from a user are relayed from the serviced client device 112 to the STB 104. When the browser is instantiated by the STB 104 at Step 410 of FIG. 4, input such as keypad input or mouse input is relayed directly from the serviced client device 112 to the STB 104 and used as input for the instantiated browser at the STB 104. Likewise, with the operation 414 of FIG. 4, user input received via the serviced client device 112 is relayed via the STB 104 to the servicing cloud server 122 for use as input in the Internet browsing session. In such case, the commands may be relayed via IP packets encapsulated as user input information for use by the instantiated browser either at the STB 104 or at the cloud server 122.

The streamed video that is produced by the STB 104 at Step 410 or the cloud server 122 at Step 414 may include icons representing selectable elements of the Internet browsing session represented by the streamed video, e.g., selectable links, boxes for text input, mouse selections, etc. For example, selectable icons, keypad numbers, mouse pointers, and other icons or selectable elements that a user would typically see at a serviced client device 112 when an Internet browsing session is instantiated thereon via browser, would be produced within the streamed video provided by the STB 104 at Step 410 or the cloud server 122 at Step 414. The input of the user created by clicking at particular points in the screen via a mouse or another input, such as a keyboard input, would then be relayed as user commands from the serviced client device 112 to either the STB 104 or the cloud server 122. In such case, this user input would be employed to alter the browser operation that is instantiated on the STB 104 or cloud server 122.

Figure 5:
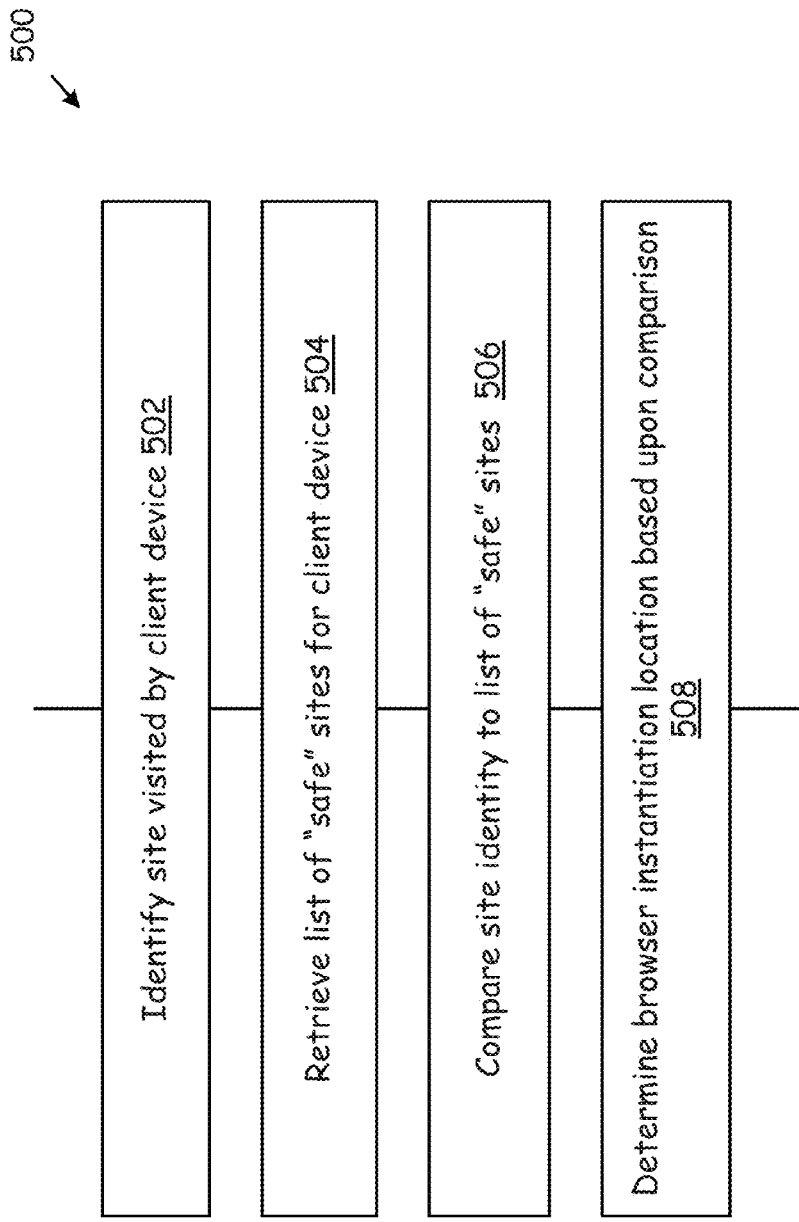
FIG. 5 is a flow chart illustrating particular operations consistent with the operations of FIGS. 3 and 4 according to one or more embodiments of the present invention.

FIG. 5 is a flow chart illustrating particular operations consistent with the operations of FIGS. 3 and 4 according to one or more embodiments of the present invention. The operations 500 of FIG. 5 include first identifying a site desired to be visited by a client device (Step 502). The site visited may be identified via keypad input, e.g., web address, from the client device or via mouse input, e.g., link selection, by the client device. Based upon the identified site, the servicing device such as the cloud server, STB or even the client device then retrieves a list of safe sites as characterized for the particular client device (Step 504). The list of safe sites may be created by the service provider, cloud server operator, STB based upon user input, or via the client device based upon user input. These safe sites may be identified as not posing too great a threat for the client device if it instantiates a browsing session.

The servicing device, such as the client device, the cloud server, or the STB then compares the site desired to be visited by the client device to the list of safe sites (Step 506). Then, based upon such comparison, a determination is made where to instantiate the browser to service the Internet browsing session (Step 508). For example, the sites that are deemed to be not safe would typically be instantiated only on advice that there are sufficient processing resources to protect the device from malware, viruses, or other destructive content that may be attempted to be downloaded during the Internet browsing session. If the serviced client device is a thin client, such as a television or DVD player, for example, the serviced client device may be allowed to browse at only a limited number of sites identified as safe sites. Such is the case because these devices would typically not have the ability to operate thereon virus protection software. In such case, the Internet browsing session would be instantiated at the cloud server or STB in order to protect the thin client from such destructive content.

The operations of FIGS. 1-5 may be modified during a web browsing session such that browser instantiation is moved from the serviced client device to the STB, from the STB to the serviced client device, from the serviced client device to the cloud server, from the cloud server to the STB, or from the cloud server to the serviced client device. Moving the instantiation of the web browser from one device to another may be based upon a change in a web site being visited, changes in available processing resources, changes in communication link characteristics, or based upon other changes in operating conditions.

Figure 6:
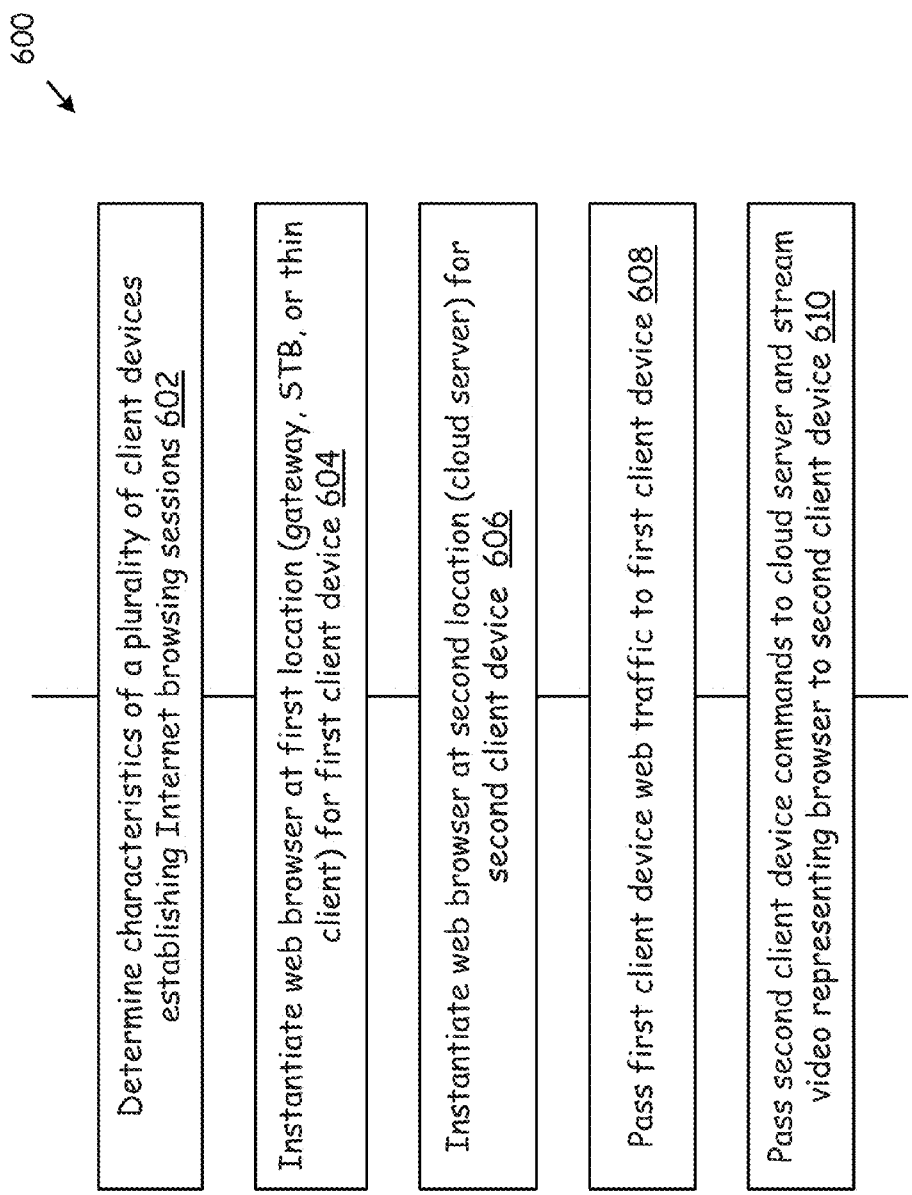
FIG. 6 is a flow chart illustrating particular operations consistent with the operations of FIGS. 3 and 4 according to one or more embodiments of the present invention.

FIG. 6 is a flow chart illustrating particular operations consistent with the operations of FIGS. 3 and 4 according to one or more embodiments of the present invention. The operations 600 of FIG. 6 commence with determining characteristics of a plurality of client devices at which a user may desire to service an Internet browsing session (Step 602). For example, with the system 100 of FIG. 1, the gateway 104 services client devices 112, 114, and 116. Likewise, the system 200 of FIG. 2 includes STB 204 that services client devices 214, 216, and 218. Each of these client devices would have different characteristics in some installations and/or operations. Further, users of each of these client devices may at the same time desire to establish Internet browsing sessions. In such case, referring back to the operations at Step 408 at FIG. 4, different decisions may be made for each serviced client device with regard to where to instantiate the web browser to service a particular Internet browsing session.

Referring again to the operations 600 of FIG. 6, a determination may be made based upon a decision at Step 602 to instantiate a web browser at a first location for a first client device (Step 604) and to instantiate a web browser at a second location for a second client device (Step 606). For example, the first location may be a first client device, which has sufficient processing resources to instantiate its web browser locally, for the first browsing session at Step 604. Likewise, for a second client device that is a thin client and is perhaps visiting a dangerous website that is likely to attack the second client device, a web browser for the second client device is instantiated at a cloud server that has robust protection against such dangerous content.

Next, the operations 600 of FIG. 6 include passing first client device web traffic to the first client device (Step 608) and passing second client device commands to the cloud server and streaming video representing the browser to the second client device (Step 610). With the operations of Step 608, because the first client device is being instantiated either on itself or at the servicing STB, the interaction between the first location, the thin client, is such that normal browser traffic between itself and a web server/website is serviced by simply passing the web traffic there between. However, with the operation of Step 610, the commands from the second client device to the cloud server that is instantiating a web browser for such browsing session will receive user commands, e.g. mouse input, keyboard input, etc. Further, because the second client device receives only streamed content, the session will not be a normal Internet browsing session between second client device and the cloud server. Thus, streamed audio/video content will be transmitted from the cloud server to the second client device and user input commands transmitted from the second client device to the cloud server at Step 610.

When the STB services multiple client devices, each having web browsers instantiated by a cloud server, the STB acts a multiplexer for streaming video representing the web browsing sessions received from one or more cloud servers and as a multiplexer for serviced client device web browsing input transmitted to one or more cloud servers. Likewise, the STB may instantiate multiple web browsers for multiple serviced clients. Moreover, the STB may instantiate one web browser for a first serviced client device and may pass streaming video and web browsing commands between a second serviced client device and a cloud server.

Figure 7:
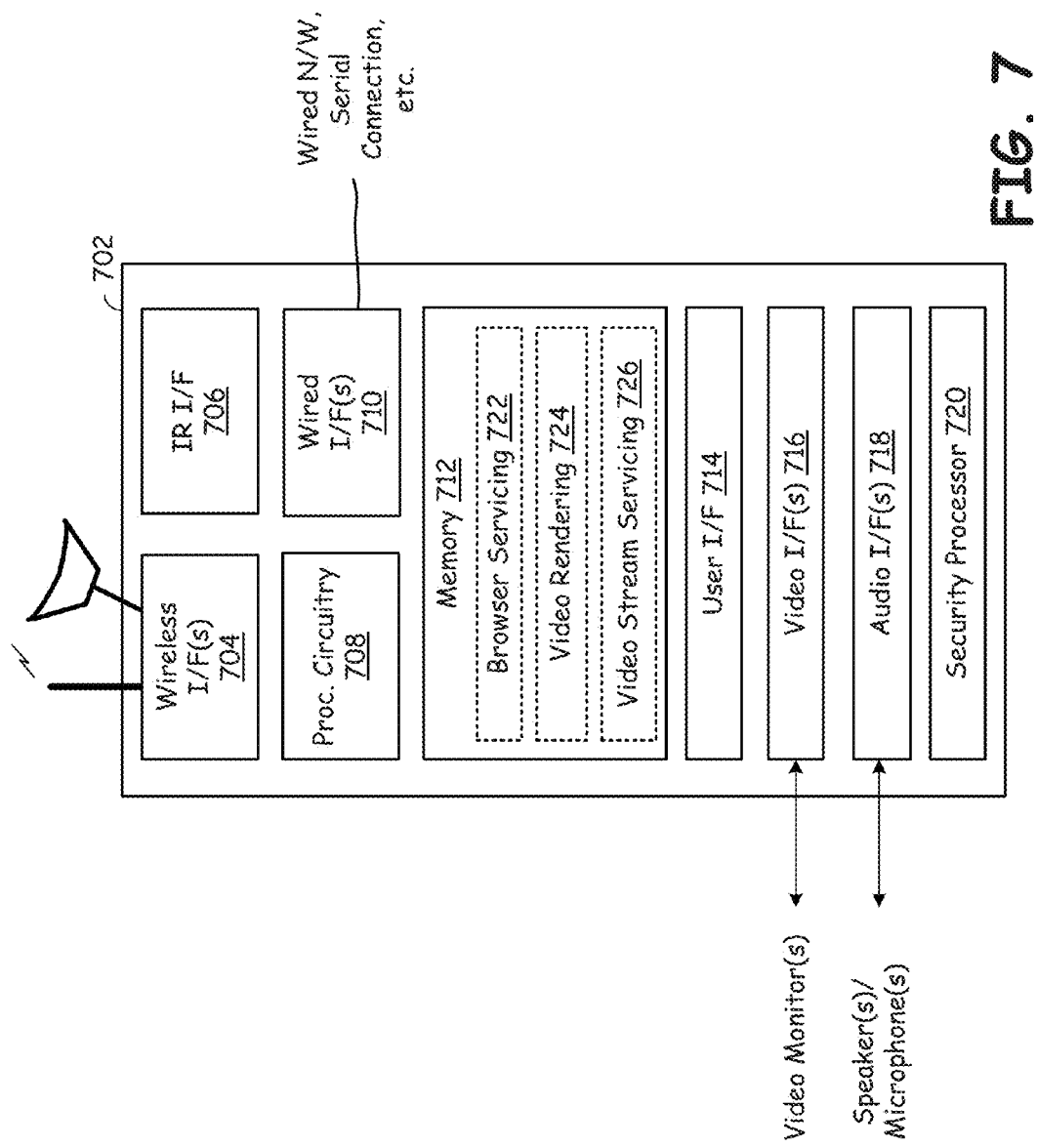
FIG. 7 is a block diagram illustrating a Set Top Box/Gateway constructed according to one or more embodiments of the present invention.

FIG. 7 is a block diagram illustrating a Set Top Box/Gateway 702 constructed according to one or more embodiments of the present invention. The STB 702 of FIG. 7 includes a wireless interface 704, an infrared interface 706, processing circuitry 708, one or more wired interfaces 710, and memory 712. The STB 702 typically would also include a user interface 714, at least one video interface 716, at least one audio interface 718, and may include a security processor 720. The wireless interfaces 704 support wireless communications with one or more wireless networks, including WLAN networks, WPAN networks, WWAN networks, satellite networks, and may also support communications with wireless serviced client devices. This wireless interface 704 may service communications consistent with cellular network standards, WPAN standards such as the Bluetooth standard, WLAN standards as IEEE 802.11x standards, WWAN standards such as the WiMAX standard, and/or another type of wireless communication standards. The IR (Infrared) interface 706 supports IR communications with remote controls and client devices. The IR communications may support an industry standard or proprietary communications protocol.

The processing circuitry 708 may include one or more of a system processor, a digital signal processor, a processing module, dedicated hardware, an application specific integrated circuit (ASIC), or other circuitry that is capable of executing software instructions and for processing data. The memory 712 may be RAM, ROM, FLASH RAM, FLASH ROM, optical memory, magnetic memory, or other types of memory that is capable of storing data and/or instructions in allowing processing circuitry to access same. The wired interfaces 710 may include a DSL interface, a USB interface, a fire wire interface, a serial interface, a parallel interface, an optical interface, or another type of interface supported by a media that is copper, metal, or optical.

The user interface 714 may include keypad, video display, cursor control, touch pad, or other type of interface that allows a user to interface with the STB 702. The video interface 716 couples the STB 702 to one or more video monitors. The communications link between the video interface 716 and the video monitor(s) may be an HDMI interface, a composite video interface, component video interface, an S-video interface, or another type of video interface supported by both the video monitor and the STB 702. The audio interface 718 couples the STB 702 to speakers and/or microphones for audio content delivery and receipt. The video camera/video camera interface 716 may include an onboard video camera or may couple the STB 702 to an external video camera. The security processor 720 provides security operations for the STB 702. The STB 702 supports the operations described with reference to FIGS. 1-6. Client devices previously described herein have structure similar to the STB 702 but may have lesser processing capabilities. In supporting these operations, computer instructions for browser servicing 722, video rendering 724, and video stream servicing 726 may be stored in memory 712.

Figure 8:
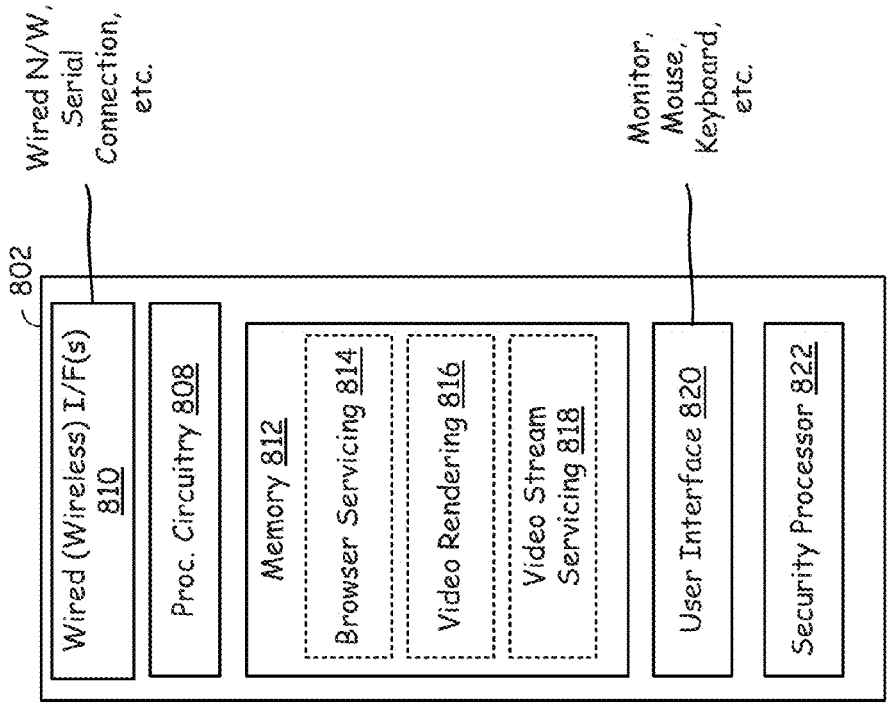
FIG. 8 is a block diagram illustrating a cloud server constructed according to one or more embodiments of the present invention.

FIG. 8 is a block diagram illustrating a cloud server constructed according to one or more embodiments of the present invention. The cloud server 802 of FIG. 8 includes one or more wired or wireless interfaces 810. Each of these wired or wireless interfaces services data communications via a corresponding communication link. The wired interface may service coaxial communications, optical communications, or another type of wired communication that may provide high throughput for a particular connection. The wireless interface may be a WLAN interface, a satellite interface, a WWAN interface, or another type of wireless interface.

The processing circuitry 808 may include one or more processing units selected from, for example, system processors, reduced instruction set computing processors, digital signal processors, ASICs, custom logic, field programmable gate arrays, or another type of processing device that is capable of executing software instructions and processing digital data. Memory 812 includes one or more of RAM, ROM, DRAM, DROM, optical memory, flash RAM, magnetic memory, or another type of memory capable of storing software instructions and data. User interface 820 interfaces the cloud server to a user via a monitor, a keyboard, mouse, and other types of user input devices. The cloud server may also include a security processor 822 that operates to guarantee that the software on the cloud server 802 is secure and that communications between the cloud server 802 and a remote device are also secure.

According to various embodiments of the present invention, the memory 812 stores specialized computer instructions to service the various operations supported by the cloud server 802. In particular, the memory 812 stores browser servicing instructions 814, video rendering instructions 816, and video stream servicing instructions 818. The browser servicing instructions 814 service an Internet browsing session when the cloud server 802 instantiates a browser to service the Internet browsing needs of one or more serviced client devices. Video rendering instructions 816 allow the cloud server 802 to render video stream representative of a service Internet browsing session. Further, video stream servicing instructions 818 stored in memory 812 allow the cloud server to stream the video representing the browser session instantiated by the cloud server.

Figure 9:
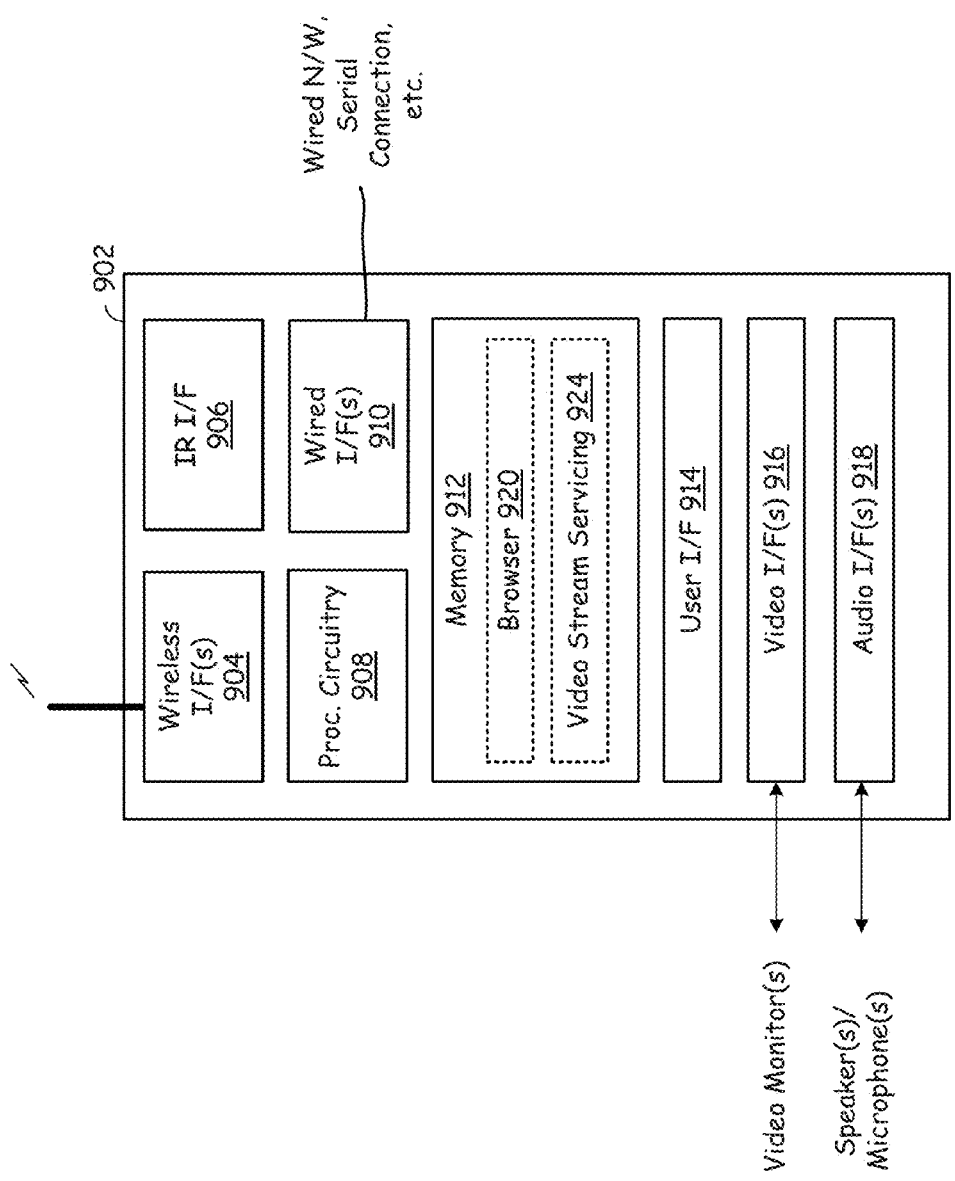
FIG. 9 is a block diagram illustrating a client device constructed according to one or more embodiments of the present invention.

FIG. 9 is a block diagram illustrating a client device constructed according to one or more embodiments of the present invention. A client device 902 of FIG. 9 may be one or more of a laptop computer, desktop computer, notepad computer, digital video player, or another type of device. Thin clients would have fewer resources than would other types of clients that operate according to the present invention. The client device 902 may include a wireless interface 904, an infrared interface 906, and/or one or more wired interfaces 910. The client device 902 includes processing circuitry 908 which includes one or more processors and may include system processors, risk processors, digital signal processors, custom logic, FPGAs, A6, or other types of processing circuitry that are capable of executing software instructions and processing digital data.

Memory 912 may be RAM, ROM, flash RAM, flash ROM, magnetic memory, optical memory, or another type of memory that is capable of storing computer instructions and data. The client device 902 may include one or more user interfaces 914, one or more video interfaces 916, and one or more audio interfaces 918. According to the present invention, the memory 912 stores software instructions that include browser instructions 920 and video stream servicing instructions 924. The browser instructions 920 are those that, when executed, cause the client device 902 to instantiate a browser for an Internet browsing session upon the client device 902. The video stream servicing instructions 924 include instructions capable of receiving a video stream and presenting the video stream to the user via the video interface 916 and the audio interface 918. Further, these instructions 920 and 924 and/or other instructions are capable to allow a user to interface with the client device 902 to provide browsing input via the user interface 914.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output (s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating a gateway device having at least one communications interface and processing circuitry, the method comprising:
    establishing communications with at least one service provider device over a service provider network;
    establishing communications with at least one serviced client device over a local area network;
    determining that the serviced client device requests to establish an Internet browsing session;
    based upon characteristics of the serviced client device, determining where to instantiate a web browser to service the Internet browsing session; and
    based upon the determination:
        in a first operation, instantiating the web browser to service the Internet browsing session at the gateway or client device; and
        in a second operation, instantiating the web browser to service the Internet browsing session at a service provider server.

2. The method of claim 1, wherein when the web browser is instantiated on the service provider server, an Internet browsing interface is streamed from the service provider server to the client device.

3. The method of claim 1, wherein characteristics of the serviced client device comprise at least one of:
    processing capabilities of the serviced client device;
    processing resources available to the serviced client device;
    serviced client device web browser functionality;
    virus protection capabilities of the serviced client device;
    malware protection capabilities of the serviced client device; and
    a selection of a web site for browsing.

4. The method of claim 1, wherein determining where to instantiate a web browser to service the Internet browsing session is further based upon at least one of:
    processing capabilities of the gateway;
    processing resources available to the gateway;
    gateway web browser functionality;
    virus protection capabilities of the gateway;
    malware protection capabilities of the gateway; and
    a selection of a web site for browsing.

5. The method of claim 1, wherein determining where to instantiate a web browser to service the Internet browsing session is further based upon a site being visited by the Internet browsing session.

6. The method of claim 5, further comprising:
    comparing the site being visited to a list of safe sites; and
    when the comparison is unfavorable, instantiating the browser by one of the gateway and the service provider server.

7. A gateway device comprising:
    at least one communications interface; and
    processing circuitry coupled to the at least one communications interface and operable to cause the gateway to:
        establish communications with at least one service provider device over a service provider network;
        establish communications with at least one serviced client device over a local area network;
        determine that the serviced client device is to establish an Internet browsing session;
        based upon characteristics of the serviced client device, determine where to instantiate a web browser to service the Internet browsing session; and
        based upon the determination:
            in a first operation, instantiate the web browser to service the Internet browsing session at the gateway or client device; and
            in a second operation, instantiate the web browser to service the Internet browsing session at a service provider server.

8. The gateway of claim 7, wherein when the web browser is instantiated on the service provider server, an Internet browsing interface is streamed from the service provider server to the client device via the gateway.

9. The gateway of claim 7, wherein characteristics of the serviced client device comprise at least one of:
    processing capabilities of the serviced client device;
    processing resources available to the serviced client device;
    serviced client device web browser functionality;
    virus protection capabilities of the serviced client device;
    malware protection capabilities of the serviced client device; and
    a selection of a web site for browsing.

10. The gateway of claim 7, wherein in determining where to instantiate a web browser to service the Internet browsing session, the processing circuitry is operable to further consider at least one of:
    processing capabilities of the gateway;
    processing resources available to the gateway;
    gateway web browser functionality;
    virus protection capabilities of the gateway;
    malware protection capabilities of the gateway; and
    a selection of a web site for browsing.

11. The gateway of claim 7, wherein in determining where to instantiate a web browser to service the Internet browsing session, the processing circuitry is operable to further consider a site being visited by the Internet browsing session.

12. The gateway of claim 11, wherein the processing circuitry is further operable to:
    compare the site being visited to a list of safe sites; and
    when the comparison is unfavorable, instantiate the browser by one of the gateway or the service provider server.

13. A method for operating a gateway device having at least one communications interface and processing circuitry, the method comprising:
    establishing communications with at least one service provider device over a service provider network;
    establishing communications with a plurality of serviced client devices over a local area network;
    determining that the plurality of serviced client devices are to establish Internet browsing sessions;
    based upon characteristics of the plurality of serviced client devices, determining where to instantiate web browsers to service the Internet browsing sessions; and
    based upon the determination:

in a first operation, instantiating web browsers to service the Internet browsing sessions at the plurality of serviced client devices; and in a second operation, instantiating the web browsers to service the Internet browsing session at a service provider server.

14. The method of claim 13, further comprising, based upon the determination, in a third operation, instantiating a first browser to service a first browsing session at a first serviced client device and instantiating a second browser to service a second browsing session at the service provider server.

15. The method of claim 13, wherein when the web browsers are instantiated on the service provider server, an Internet browsing interface is streamed from the service provider server to the plurality of serviced client devices via the gateway.

16. The method of claim 15, wherein the gateway serves as a multiplexer/demultiplexer for Internet browsing interface streaming and Internet browsing commands between the service provider server and the plurality of serviced client devices.

17. The method of claim 15, wherein the gateway bundles Internet browsing input received from the plurality of client devices for delivery to the service provider server.

18. The method of claim 13, wherein characteristics of the serviced client devices comprise at least one of:
   processing capabilities of the serviced client devices;
   processing resources available to the serviced client devices;
   serviced client devices web browser functionality;
   virus protection capabilities of the serviced client devices;
   malware protection capabilities of the serviced client devices; and
   selection of a web site for browsing.

19. The method of claim 13, wherein determining where to instantiate web browsers to service the Internet browsing session is further based upon sites being visited by the Internet browsing sessions.

20. The method of claim 19, further comprising:
   comparing the sites being visited to a list of safe sites; and
   when the comparison is unfavorable, instantiating the browsers by the service provider server.

21. A gateway device comprising:
   at least one communications interface; and
   processing circuitry coupled to the at least one communications interface and operable to cause the gateway to:
      establishing communications with at least one service provider device over a service provider network;
      establishing communications with a plurality of serviced client devices over a local area network;
      determining that the plurality of serviced client devices are to establish Internet browsing sessions;
      based upon characteristics of the plurality of serviced client devices, determining where to instantiate web browsers to service the Internet browsing sessions; and
      based upon the determination:
         in a first operation, instantiate web browsers to service the Internet browsing sessions at the plurality of serviced client devices; and
         in a second operation, instantiate the web browsers to service the Internet browsing session at a service provider server.

22. The gateway of claim 21, further based upon the determination, in a third operation, the processing circuitry operable to instantiate a first browser to service a first browsing session at a first serviced client device and instantiate a second browser to service a second browsing session at the service provider server.

23. The gateway of claim 21, wherein when the web browsers are instantiated on the service provider server, an Internet browsing interface is streamed from the service provider server to the plurality of serviced client devices via the gateway.

24. The gateway of claim 23, wherein the gateway serves as a multiplexer/demultiplexer for Internet browsing interface streaming and Internet browsing commands between the service provider server and the plurality of serviced client devices.

25. The gateway of claim 21, wherein the gateway bundles Internet browsing input received from the plurality of client devices for delivery to the service provider server.

26. The gateway of claim 21, wherein characteristics of the serviced client devices comprise at least one of:
   processing capabilities of the serviced client devices;
   processing resources available to the serviced client devices;
   serviced client devices web browser functionality;
   virus protection capabilities of the serviced client devices;
   malware protection capabilities of the serviced client devices; and
   selection of a web site for browsing.

27. The gateway of claim 21, wherein determining where to instantiate web browsers to service the Internet browsing session is further based upon sites being visited by the Internet browsing sessions.

28. The gateway of claim 27, wherein the processing circuitry is further operable to:
   compare the sites being visited to a list of safe sites; and
   when the comparison is unfavorable, instantiate the browsers by the service provider server.

* * * * *